(12) United States Patent
Levitsky et al.

(10) Patent No.: US 11,252,731 B1
(45) Date of Patent: Feb. 15, 2022

(54) BEAM MANAGEMENT BASED ON LOCATION AND SENSOR DATA

(71) Applicant: QUALCOMM Incorporated, San Diego, CA (US)

(72) Inventors: Michael Levitsky, Rehovot (IL); Guy Wolf, Rosh Haayin (IL); Assaf Touboul, Netanya (IL); Shay Landis, Hod Hasharon (IL); Sharon Levy, Binyamina (IL); Noam Zach, Kiryat Ono (IL); David Yunusov, Holon (IL); Peer Berger, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/009,402

(22) Filed: Sep. 1, 2020

(51) Int. Cl.
*H04W 72/00* (2009.01)
*H04W 4/00* (2018.01)
*H04W 72/04* (2009.01)
*H04W 72/02* (2009.01)
*G01S 11/04* (2006.01)
*G01S 5/06* (2006.01)
*G06T 17/00* (2006.01)

(52) U.S. Cl.
CPC ............ *H04W 72/046* (2013.01); *G01S 5/06* (2013.01); *G01S 11/04* (2013.01); *G06T 17/00* (2013.01); *H04W 72/02* (2013.01); *H04W 72/048* (2013.01)

(58) Field of Classification Search
CPC . H04W 72/046; H04W 72/02; H04W 72/048; G01S 5/06; G01S 11/04; G06T 17/00
USPC ....................................................... 455/452.1
See application file for complete search history.

(56) References Cited

U.S. PATENT DOCUMENTS

| | | | |
|---|---|---|---|
| 2007/0249402 A1* | 10/2007 | Dong | H04W 16/28 455/562.1 |
| 2017/0257780 A1* | 9/2017 | Ryoo | H04W 36/28 |
| 2017/0331670 A1* | 11/2017 | Parkvall | H04J 11/0079 |
| 2018/0373933 A1* | 12/2018 | Ghinamo | G06T 19/006 |
| 2019/0097712 A1* | 3/2019 | Singh | H04B 7/04 |
| 2019/0288759 A1* | 9/2019 | Wakid | H04B 7/0617 |
| 2019/0319686 A1* | 10/2019 | Chen, IV | H04B 7/088 |

* cited by examiner

*Primary Examiner* — Mark G. Pannell
(74) *Attorney, Agent, or Firm* — Norton Rose Fulbright US LLP; Kevin M. Donnelly

(57) ABSTRACT

The present disclosure involves determining base station (BS) beams for communicating between a UE and the BS. The BS may use sensor data or beam management reporting history to assist with determining one or more appropriate beams. The sensor data may include camera images, radar data, or lidar data, and be used to model the cell environment served by the BS. The BS may obtain reporting data from multiple UEs over time indicating the quality of beams received by the UEs at various locations in the cell environment and model the cell environment based on the reporting data. The BS may associate beams with possible UE locations within the cell environment and use the associations to determine beams for communicating with a UE after determining the UE's location.

36 Claims, 9 Drawing Sheets

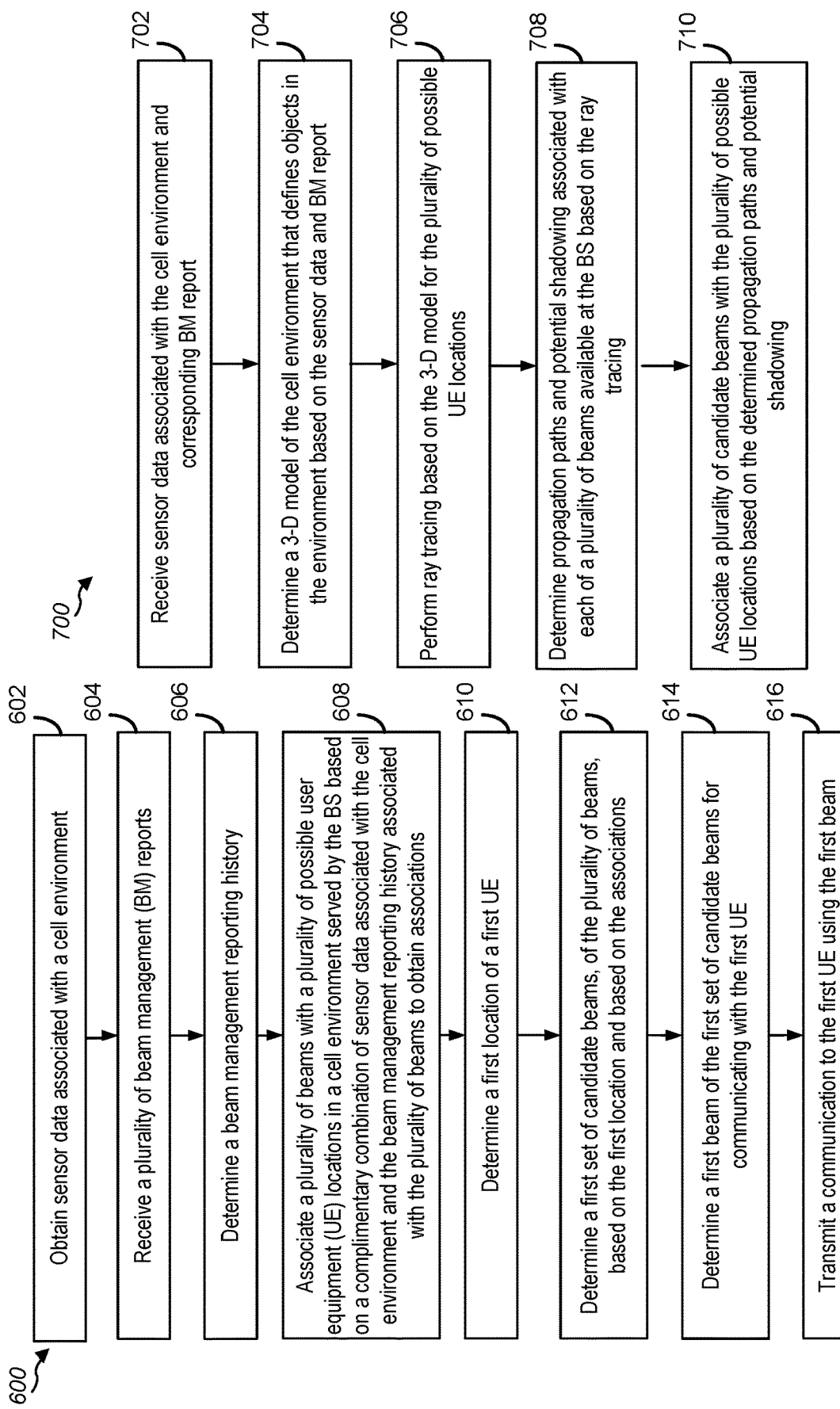

BEAM MANAGEMENT BASED ON LOCATION AND SENSOR DATA

TECHNICAL FIELD

Aspects of the present disclosure relate generally to wireless communication systems, and more particularly, to beam management based on device location in a cell environment in conjunction with sensor data.

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of base stations or network access nodes, each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

Base stations handle communications within a wireless communication system by dividing the system into cells associated with each of the base stations. The base stations have antennas that form beams of wireless signals that can be transmitted to UEs. These beams interact with their environment, such as by being absorbed by some objects and reflected by other objects. The changing environment around base stations or a UE may result in changes in the quality of wireless signals received over the beams when the absorption and reflection characteristics of the environment change. For example, some beams may become blocked for some UEs as the cell environment or a local UE environment changes. Cells operating in millimeter wave spectrum may implement narrow directional beams that are affected more by the changing propagation environment, thus limiting support for communicating with UEs that are mobile within the cell environment and also for static UEs residing in a dynamic cell environment.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method for wireless communication performed by a base station (BS). The method includes obtaining sensor data associated with a cell environment served by the BS; receiving a plurality of beam management (BM) reports, associated with a plurality of beams transmitted by the BS, from a plurality of user equipments (UEs) at a plurality of possible UE locations in the cell environment; determining a beam management reporting history based on the plurality of BM reports; associating the plurality of beams with the plurality of possible UE locations based on the sensor data and the beam management reporting history; determining a first location of a first UE in the cell environment; determining a first set of one or more candidate beams of the plurality of beams based on the first location and based on the associating; determining a first beam of the first set of one or more candidate beams for communicating with the first UE; and transmitting a communication to the first UE using the first beam. The method may be implemented in a base station (BS). The BS includes at least one processor and a memory coupled with the at least one processor and storing processor-readable instructions that, when executed by the at least one processor, is configured to perform aspects of embodiments of the disclosed methods.

Another innovative aspect of the subject matter described in this disclosure can be implemented in a method for wireless communication performed by a user equipment (UE). The method includes receiving wireless signals from a base station (BS) transmitted using a first beam of a first set of one or more candidate beams determined based on associations of a plurality of beams with a plurality of possible UE locations in a cell environment served by the BS and based on a first location of the UE, the associations being based on sensor data associated with the cell environment and a beam management reporting history associated with the plurality of beams and the plurality of possible UE locations. The UE includes at least one processor and a memory coupled with the at least one processor and storing processor-readable instructions that, when executed by the at least one processor, is configured to perform aspects of embodiments of the disclosed methods.

Another innovative aspect of the subject matter described in this disclosure can be implemented in a base station apparatus configured for wireless communication. The apparatus includes means for obtaining sensor data associated with a cell environment served by the BS; means for receiving a plurality of beam management (BM) reports, associated with a plurality of beams transmitted by the BS, from a plurality of user equipments (UEs) at a plurality of possible UE locations in the cell environment; means for determining a beam management reporting history based on the plurality of BM reports; means for associating the plurality of beams with the plurality of possible UE locations based on the sensor data and the beam management reporting history; means for determining a first location of a first UE in the cell environment; determining a first set of one or more candidate beams of the plurality of beams based on the first location and based on the associating; means for determining a first beam of the first set of one or more candidate beams for communicating with the first UE; and means for transmitting a communication to the first UE using the first beam.

Another innovative aspect of the subject matter described in this disclosure can be implemented in a UE apparatus configured for wireless communication. The apparatus includes means for receiving wireless signals from a base station (BS) transmitted using a first beam of a first set of one or more candidate beams determined based on associations of a plurality of beams with a plurality of possible UE locations in a cell environment served by the BS and based on a first location of the UE, the associations being based on sensor data associated with the cell environment and a beam management reporting history associated with the plurality of beams and the plurality of possible UE locations.

Another innovative aspect of the subject matter described in this disclosure can be implemented in a non-transitory computer-readable medium storing instructions that, when executed by a processor of a base station, cause the processor to perform operations including obtaining sensor data associated with a cell environment served by the BS; receiving a plurality of beam management (BM) reports, associated with a plurality of beams transmitted by the BS, from a plurality of user equipments (UEs) at a plurality of possible UE locations in the cell environment; determining a beam management reporting history based on the plurality of BM reports; associating the plurality of beams with the plurality of possible UE locations based on the sensor data and the beam management reporting history; determining a first location of a first UE in the cell environment; determining a first set of one or more candidate beams of the plurality of beams based on the first location and based on the associating; determining a first beam of the first set of one or more candidate beams for communicating with the first UE; and transmitting a communication to the first UE using the first beam. The method may be implemented in a base station (BS).

Another innovative aspect of the subject matter described in this disclosure can be implemented in a non-transitory computer-readable medium storing instructions that, when executed by a processor of a user equipment, cause the processor to perform operations including receiving wireless signals from a base station (BS) transmitted using a first beam of a first set of one or more candidate beams determined based on associations of a plurality of beams with a plurality of possible UE locations in a cell environment served by the BS and based on a first location of the UE, the associations being based on sensor data associated with the cell environment and a beam management reporting history associated with the plurality of beams and the plurality of possible UE locations.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a flow diagram illustrating an example process that supports beam selection based on a complementary combination of sensor data and beam management reporting history according to some aspects.

FIG. 7 is a flow diagram illustrating an example process that supports beam selection based on a model of a cell environment using ray tracing around objects determined from sensor data according to some aspects.

Like reference numbers and designations in the various drawings indicate like elements.

DETAILED DESCRIPTION

Figure 1:
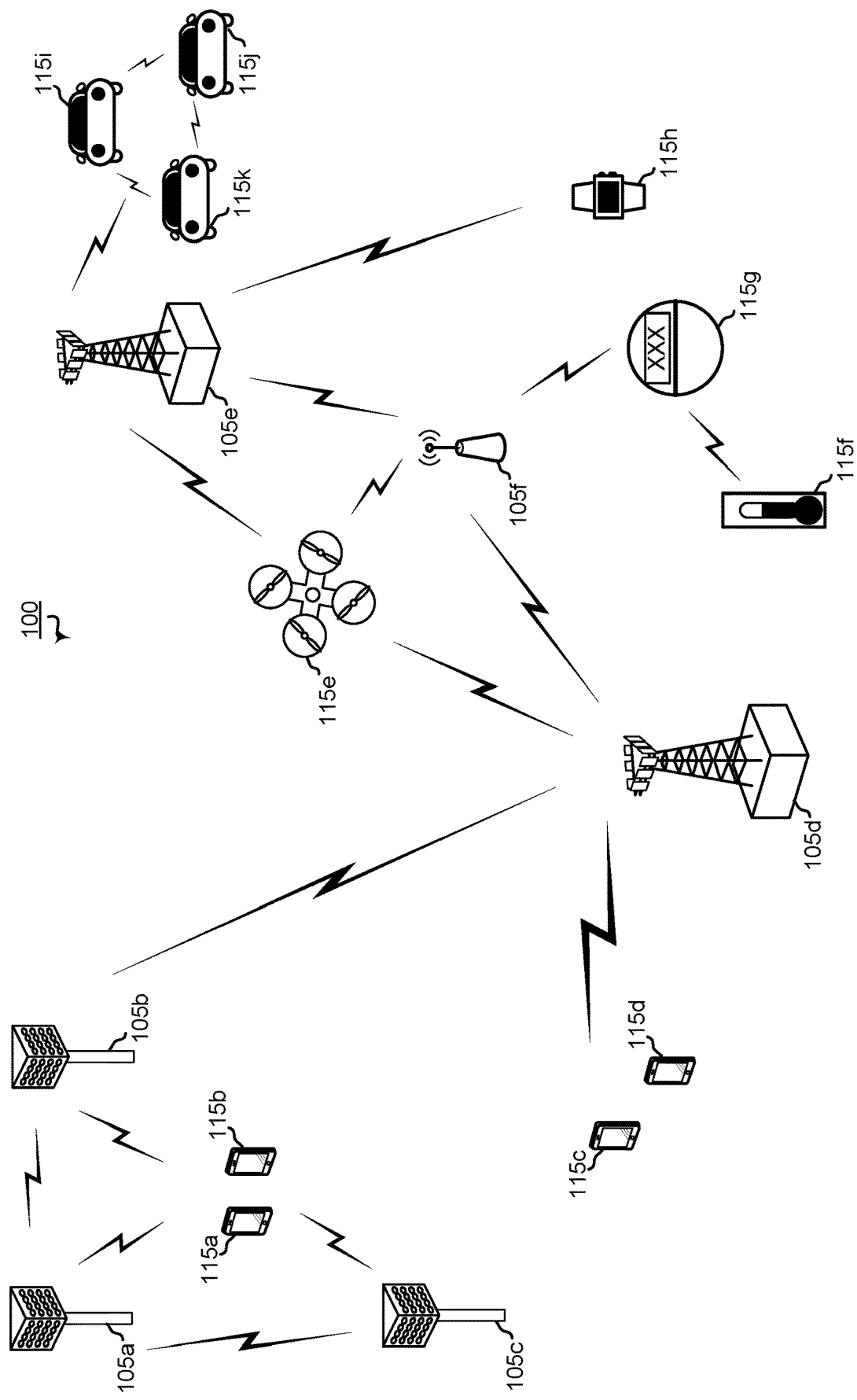
FIG. 1 is a block diagram illustrating details of an example wireless communication system.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The electromagnetic spectrum is often subdivided, based on frequency (or wavelength), into various classes, bands or channels. In fifth generation (5G) new radio (NR), two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band/spectrum in documents and articles, despite being different than the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The present disclosure provides systems, apparatus, methods, and computer-readable media for determining base station (BS) beams for communicating between a UE and the BS. In some aspects, techniques disclosed herein may enable the BS to determine one or more appropriate beams for the UE based on the UE's location within a cell environment served by the BS. The BS may use sensor data or beam management reporting history to assist with determining the one or more appropriate beams. According to aspects presented herein, the BS may obtain sensor data, such as camera images, radar (radio detection and ranging) data, or lidar (laser imaging, detection, and ranging) data to model the cell environment served by the BS. According to aspects presented herein, the BS may obtain reporting data from multiple UEs over time indicating the quality of beams received by the UEs at various locations in the cell environment, and model the cell environment based on the reporting data. As an example, the BS may receive a camera image from which an amount of foliage on a plant near the BS or a UE may be determined and used to model potential blocking of a beam transmitted from the BS, allowing the BS to determine a different beam for communicating with a UE in a vicinity of the plant near the BS. According to aspects presented herein, the BS may associate beams with possible UE locations within the cell environment and use the associations to determine beams for communicating with a UE after determining the UE's location. In some embodiments, the serving BS beam width may be selected per UE depending on the UE movement speed and environment dynamics using this enhanced ability to track UE location, movement trajectory, and environment changes through the complimentary combination of sensor data, UE position, and UE location reporting.

Particular implementations of the subject matter described in this disclosure can be implemented to realize one or more of the following potential advantages. In some aspects, the present disclosure provides improved link quality with UEs served by the BS using sensor data or beam management reporting history to determine one or more beams for communicating with the UE. For example, potential shadowing of a beam can reduce link quality and thus reduce user experience by allowing dropped calls or lost data packets. The BS may use the sensor data or beam management reporting history to determine beams with high quality reception at a UE's location to improve user experience. In addition, the BS may transmit lists of candidate beams for a UE based on the UE's location with beams designated as serving beams or candidate beams. The provisioning of candidate beams on the UE may be performed without a high frequency of BM reporting, such that the BS can configure a lower periodicity of BM reporting by the UE or turn off BM reporting by the UE to save UL resources and to reduce UE power consumption.

Further, fast switching to an alternate beam may be facilitated if blocking of a serving beam is predicted based on the sensor data or beam management reporting history. For example, the BS may have determined a serving beam for communicating with the UE but sensor data later acquired allows the BS to predict the serving beam will be blocked, such as by a moving bus in the street. The BS may quickly switch to the alternate beam based on the prediction by signaling a switch to the alternate beam to avoid a dropped call from the UE. An alternate beam may correspond to an activated TCI states (serving beams) such that for every allocation, DCI can signal the corresponding TCI state for an alternate beam from the serving beams (one of the activated, up to 8 activated TCI states) to provide an indication regarding a beam for transmission so that a beam switch can be performed on a slot basis.

Through some of the embodiments described below, the BS may track several candidate beams from the BS's available beams based on associations between the beams and a UE location and trigger beam switching with proper timing even without any prior beam management (BM) session scheduling (in DL or UL) for conventional determination of the candidate beams. Thus, the serving beam switching will be done more precisely and within required timeframes to improve link performance. In some embodiments, AP P2 sessions can be scheduled to verify the best beams among the known set of candidate beams prior to the beam switching. Those AP P2 sessions may be done at timings based on provisioning for potentially required beam switching to maintain link performance.

Benefits of some embodiments of this disclosure may include one or more of improved mobility support for FR2 cells in relation to beam management aspects (prediction of beam reselection/beam change timing), more robust and responsive beam management that is less dependent on UE BM reports, proactive beam switching that prevents beam/link failure in case of severe shadowing, improved linked quality and user experience in millimeter wave (mmw) cells, more efficient usage of cell resources (through fewer BM reports and higher spectral efficiency of the link), UE power saving and processing complexity reduction, improved MPE ability on UE side because proper alternative UL beams for MPE are always known to the UE, or more accurate UE location tracking.

This disclosure relates generally to providing or participating in authorized shared access between two or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km2), ultra-low complexity (such as ~10 s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as 99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

Figure 2:
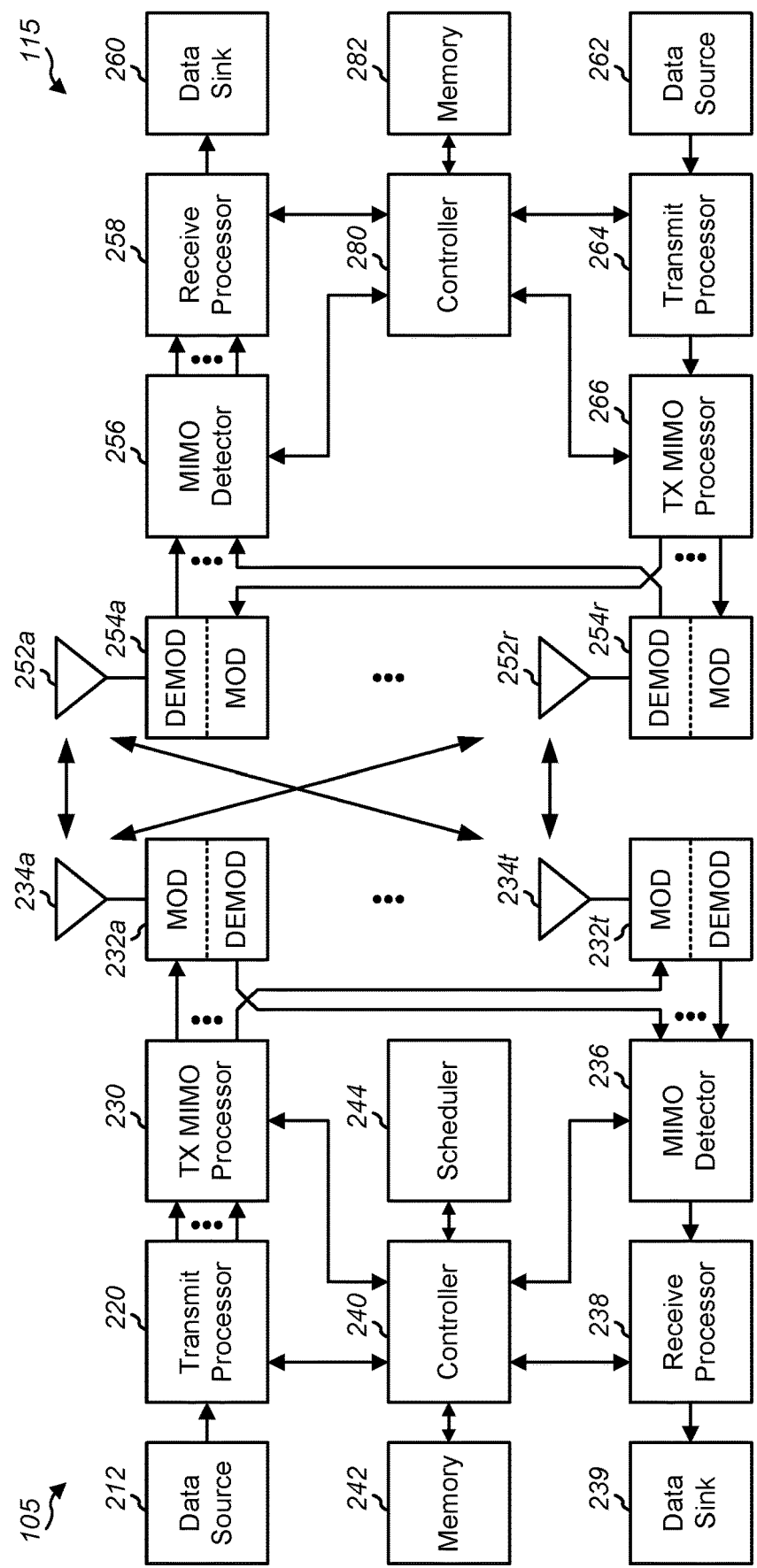
FIG. 2 is a block diagram conceptually illustrating an example design of a base station (BS) and a user equipment (UE).

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIG.

8, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

The present disclosure provides systems, apparatus, methods, and computer-readable media for determining base station (BS) beams for communicating between a UE and the BS. In some aspects, techniques disclosed herein may enable the BS to determine one or more appropriate beams for the UE based on the UE's location within a cell environment served by the BS. The BS may use sensor data or beam management reporting history to assist with determining the one or more appropriate beams. According to aspects presented herein, the BS may obtain sensor data, such as camera images, radar (radio detection and ranging) data, or lidar (laser imaging, detection, and ranging) data to model the cell environment served by the BS. According to aspects presented herein, the BS may obtain reporting data from multiple UEs over time indicating the quality of beams received by the UEs at various locations in the cell environment, and model the cell environment based on the reporting data. As an example, the BS may receive a camera image from which an amount of foliage on a plant near the BS or a UE may be determined and used to model potential blocking of a beam transmitted from the BS, allowing the BS to determine a different beam for communicating with a UE in a vicinity of the plant near the BS. According to aspects presented herein, the BS may associate beams with possible UE locations within the cell environment and use the associations to determine beams for communicating with a UE after determining the UE's location. In some embodiments, the serving BS beam width may be selected per UE depending on the UE movement speed and environment dynamics using this enhanced ability to track UE location, movement trajectory, and environment changes through the complimentary combination of sensor data, UE position, and UE location reporting.

Particular implementations of the subject matter described in this disclosure can be implemented to realize one or more of the following potential advantages. In some aspects, the present disclosure provides improved link quality with UEs served by the BS using sensor data or beam management reporting history to determine one or more beams for communicating with the UE. For example, potential shadowing of a beam can reduce link quality and thus reduce user experience by allowing dropped calls or lost data packets. The BS may use the sensor data or beam management reporting history to determine beams with high quality reception at a UE's location to improve user experience. In addition, the BS may transmit lists of candidate beams for a UE based on the UE's location with beams designated as serving beams or candidate beams. The provisioning of candidate beams on the UE may be performed without a high frequency of BM reporting, such that the BS can configure a lower periodicity of BM reporting by the UE or turn off BM reporting by the UE to save UL resources and to reduce UE power consumption.

Further, fast switching to an alternate beam may be facilitated if blocking of a serving beam is predicted based on the sensor data or beam management reporting history. For example, the BS may have determined a serving beam for communicating with the UE but sensor data later acquired allows the BS to predict the serving beam will be blocked, such as by a moving bus in the street. The BS may quickly switch to the alternate beam based on the prediction by signaling a switch to the alternate beam to avoid a dropped call from the UE. An alternate beam may correspond to an activated TCI states (serving beams) such that for every allocation, DCI can signal the corresponding TCI state for an alternate beam from the serving beams (one of the activated, up to 8 activated TCI states) to provide an indication regarding a beam for transmission so that a beam switch can be performed on a slot basis.

Through some of the embodiments described below, the BS may track several candidate beams from the BS's available beams based on associations between the beams and a UE location and trigger beam switching with proper timing even without any prior beam management (BM) session scheduling (in DL or UL) for conventional determination of the candidate beams. Thus, the serving beam switching will be done more precisely and within required timeframes to improve link performance. In some embodiments, AP P2 sessions can be scheduled to verify the best beams among the known set of candidate beams prior to the beam switching. Those AP P2 sessions may be done at timings based on provisioning for potentially required beam switching to maintain link performance.

Benefits of some embodiments of this disclosure may include one or more of improved mobility support for FR2 cells in relation to beam management aspects (prediction of beam reselection/beam change timing), more robust and responsive beam management that is less dependent on UE BM reports, proactive beam switching that prevents beam/link failure in case of severe shadowing, improved linked quality and user experience in millimeter wave (mmw) cells, more efficient usage of cell resources (through fewer BM reports and higher spectral efficiency of the link), UE power saving and processing complexity reduction, improved MPE ability on UE side because proper alternative UL beams for MPE are always known to the UE, or more accurate UE location tracking.

Figure 3:
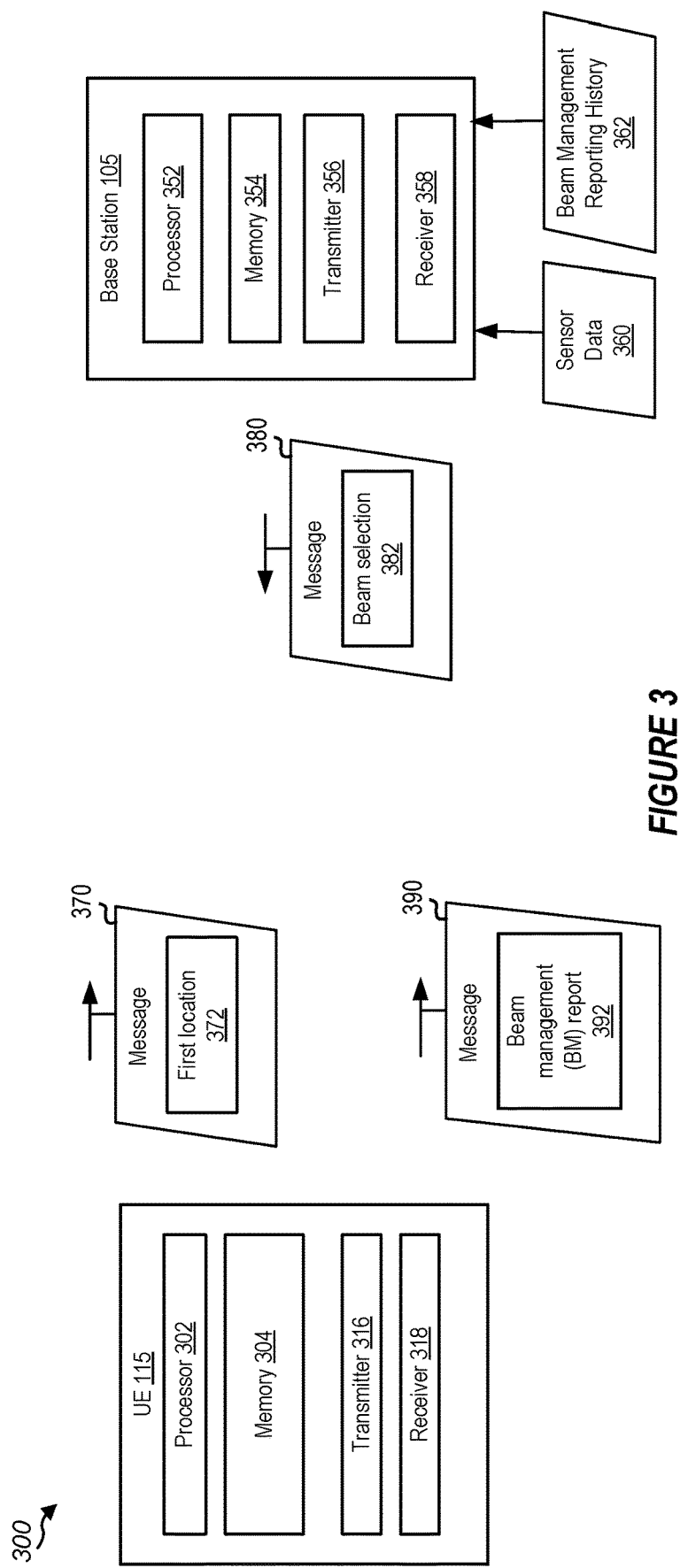
FIG. 3 is a block diagram illustrating an example wireless communication system that supports beam selection based on a complementary combination of sensor data and beam management reporting history according to some aspects.

FIG. 3 is a block diagram of an example wireless communications system 300 that supports beam selection based on sensor data according to some aspects. In some examples, the wireless communications system 300 may implement aspects of the wireless network 100. The wireless communications system 300 includes the UE 115 and the base station 105. Although one UE 115 and one base station 105 are illustrated, in some other implementations, the wireless communications system 300 may generally include multiple UEs 115, and may include more than one base station 105.

The UE 115 can include a variety of components (such as structural, hardware components) used for carrying out one or more functions described herein. For example, these components can include one or more processors 302 (hereinafter referred to collectively as "the processor 302"), one or more memory devices 304 (hereinafter referred to collectively as "the memory 304"), one or more transmitters 316 (hereinafter referred to collectively as "the transmitter 316"), and one or more receivers 318 (hereinafter referred to collectively as "the receiver 318"). The processor 302 may be configured to execute instructions stored in the memory 304 to perform the operations described herein. In some implementations, the processor 302 includes or corresponds to one or more of the receive processor 258, the transmit processor 264, and the controller 280, and the memory 304 includes or corresponds to the memory 282.

The transmitter 316 is configured to transmit reference signals, control information and data to one or more other devices, and the receiver 318 is configured to receive references signals, synchronization signals, control information and data from one or more other devices. For example, the transmitter 316 may transmit signaling, control information and data to, and the receiver 318 may receive signaling, control information and data from, the base station 105. In some implementations, the transmitter 316 and the receiver 318 may be integrated in one or more transceivers. Additionally or alternatively, the transmitter 316 or the receiver 318 may include or correspond to one or more components of the UE 115 described with reference to FIG. 2.

The base station 105 can include a variety of components (such as structural, hardware components) used for carrying out one or more functions described herein. For example, these components can include one or more processors 352 (hereinafter referred to collectively as "the processor 352"), one or more memory devices 354 (hereinafter referred to collectively as "the memory 354"), one or more transmitters 356 (hereinafter referred to collectively as "the transmitter 356"), and one or more receivers 358 (hereinafter referred to collectively as "the receiver 358"). The processor 352 may be configured to execute instructions stored in the memory 354 to perform the operations described herein. In some implementations, the processor 352 includes or corresponds to one or more of the receive processor 238, the transmit processor 220, and the controller 240, and the memory 354 includes or corresponds to the memory 242.

The transmitter 356 is configured to transmit reference signals, synchronization signals, control information and data to one or more other devices, and the receiver 358 is configured to receive reference signals, control information and data from one or more other devices. For example, the transmitter 356 may transmit signaling, control information and data to, and the receiver 358 may receive signaling, control information and data from, the UE 115. In some implementations, the transmitter 356 and the receiver 358 may be integrated in one or more transceivers. Additionally or alternatively, the transmitter 356 or the receiver 358 may include or correspond to one or more components of base station 105 described with reference to FIG. 2.

In some implementations, the wireless communications system 300 implements a 5G New Radio (NR) network. For example, the wireless communications system 300 may include multiple 5G-capable UEs 115 and multiple 5G-capable base stations 105, such as UEs and base stations configured to operate in accordance with a 5G NR network protocol such as that defined by the 3GPP.

During operation of the wireless communications system 300, the BS 105 may receive sensor data 360 from sensors monitoring a cell environment served by the BS 105. The sensor data may include camera data, radar data, lidar data, or a combination thereof. The BS 105 may also receive beam management (BM) reports from US 115. The BS 105 may generate a model of the cell environment based on a complementary combination of the sensor data 360 and beam management reporting history 362 assembled from the BM reports, or based on each one of these information sources separately. The BS 105 may receive an indication 372 of a first location of the UE 115 in a message 370. The first location may be determined by the UE 115 using a satellite position system (SPS), such as the global positioning system (GPS), GLObal NAvigation Satellite System (GLONASS), or Beidou, or other location determination systems, such as triangulation, network-determined location services, or crowdsourced Wi-Fi locations. Based on the model of the cell environment determined from a complementary combination of the sensor data 360 and the beam management reporting history 362, the BS 105 may determine a beam from a plurality of beams available for communicating with the UE 115 residing at a specific location or spot and transmit an indication 382 of the determined beam in a message 380 to the UE 115. The BS 105 and the UE 115 may communicate over the beam indicated in message 380. The BS 105 may also receive a beam management (BM) report 392 in a message 390 received from the UE 115. The BS 105 may associate the BM report 392 with the first location of the UE 115 and accumulate received beam reports in the beam management reporting history 362. In some embodiments, the BS 105 association with the first location may be determined from a location of the UE 115 included in the BM report 392. Additional details of aspects of the present disclosure are described with reference to subsequent figures.

As described with reference to FIG. 3, the present disclosure provides techniques for enhancing beam management in a wireless communication system that addresses static and dynamic environment changes through the acquisition and use of a complimentary combination of sensor data and beam management reporting history, or each individually, describing the cell environment served by the BS. Certain aspects of the disclosure may achieve benefits such as improved user experience when operating the UE. Aspects that result in this improved user experience include more robust and responsive beam management, proactive beam switching that prevents communication failures by predicting beam shadowing events, improved link quality through more optimal beam selection, more efficient usage of cell resources, UE power saving, UE processing complexity reduction, quicker switching to alternate beams, or a combination thereof. Some benefits may be particularly advantageous in operation of FR2 cells and other millimeter wave cells because the smaller range of such cells allows for more comprehensive sensor data to be accumulated and a higher accuracy model of the cell environment generated.

Figure 4:
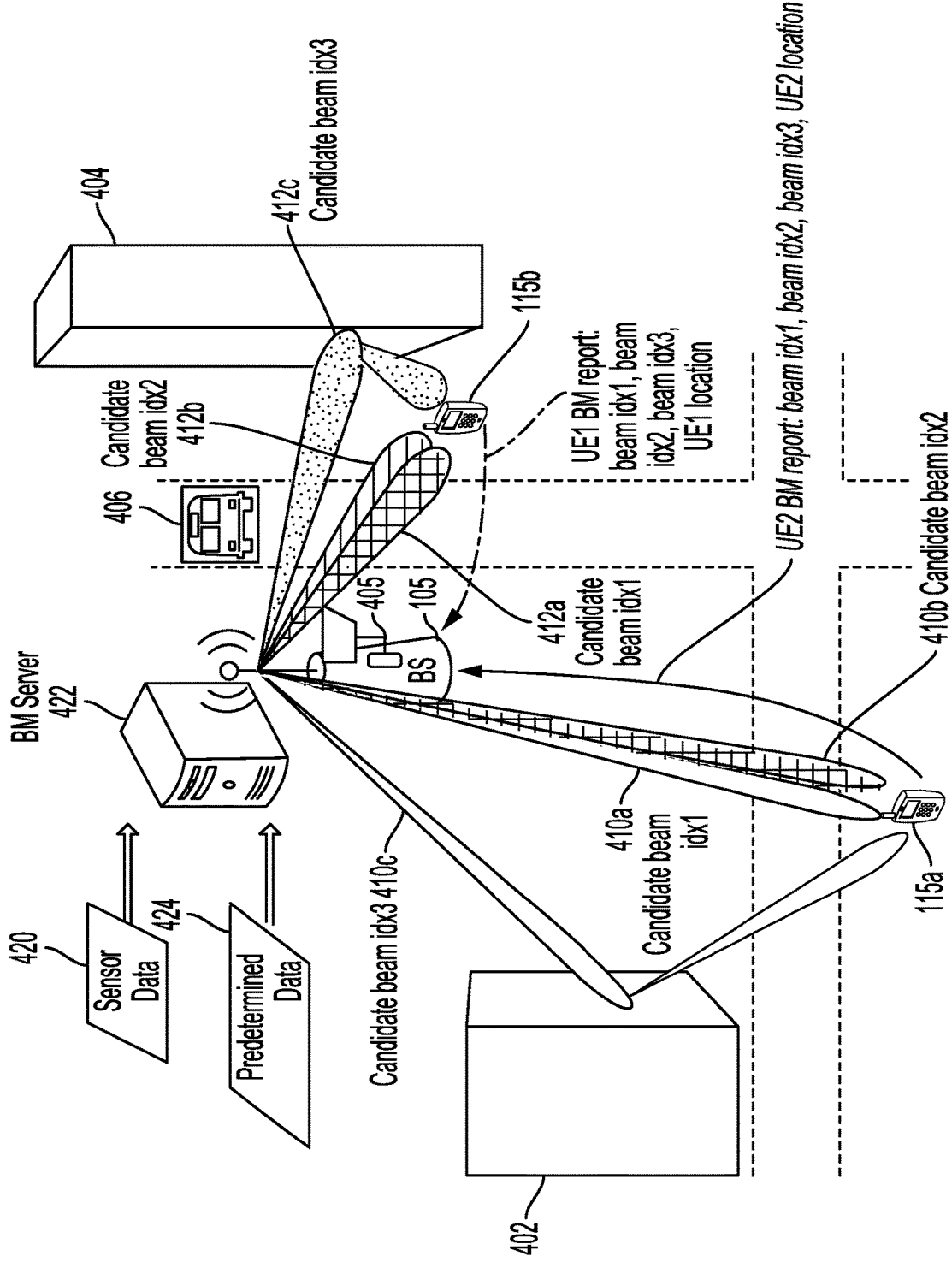
FIG. 4 is a block diagram illustrating an example model of a cell environment served by a BS according to some aspects.
Figure 5:
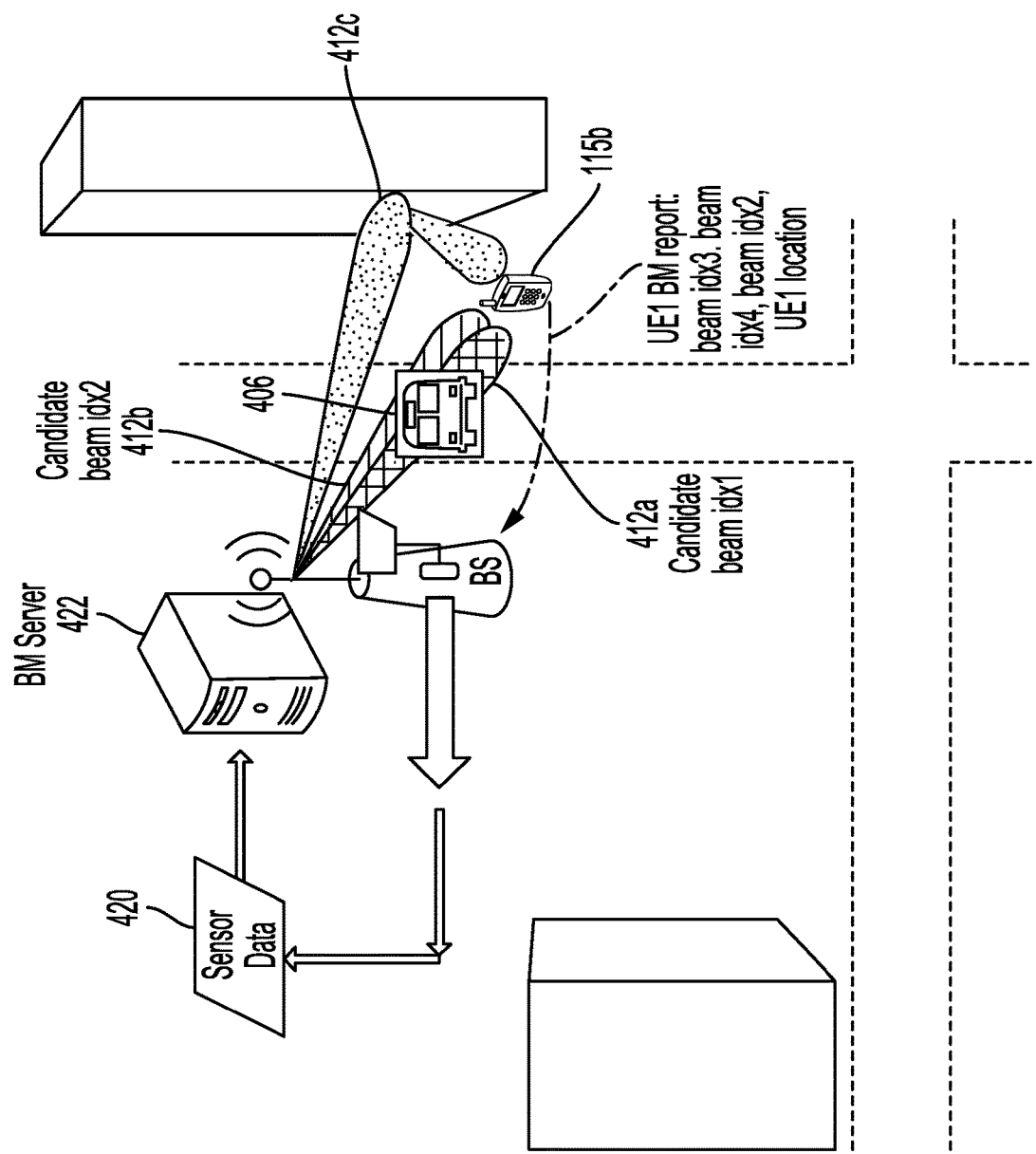
FIG. 5 is a block diagram illustrating an example model of a cell environment served by a BS with shadowing of some beams according to some aspects.

An example scenario illustrating the benefit of beam management using sensor data is illustrated in a wireless communication system in FIGS. 4 and 5. A wireless communication system includes the BS 105 and UEs 115a-b in communication with the BS 105. The BS 105 may have a plurality of beams available to communicate with each of the UEs 115a-b. The BS 105 may manage associations of some of those plurality of beams with possible UE locations within the cell environment served by the BS. For example, the BS 105 may associate candidate beams 410a-c with a location of UE 115a, and the BS 105 may associate candidate beams 412a-c with a location of UE 115b. Objects in the cell environment served by the BS 105 may affect link quality of the candidate beams 410a-c and 412a-c. For example, buildings 402 and 404 may generate reflections of candidate beams 410c and 412c that allow UEs 115a and 115b to communicate on those respective beams. Buildings 402 and 404 are examples of static aspects of the environment. Other objects in the environment may be dynamic, such as objects that result in short-term changes (e.g., objects that move on a per-hour, per-minute, or per-second basis such as vehicle 406, people on the street, and moving windows in buildings) and objects that result in long-term changes (e.g., objects that move on a per-day, per-month, or per-year basis such as plants with foliage). The vehicle 406 is a dynamic aspect of the environment because the vehicle 406 is moving in the street, which may have a short-term effect on the availability of beams for communicating with UEs 115a-b. Plants are another example of a dynamic aspect of the cell environment because the plants may have foliage that increases and decreases with outdoor conditions, such as whether the plant maintains foliage during the winter or lose foliage during the winter.

The BS 105 may benefit from using sensor data about the environment of the BS 105 or a UE in managing beams used to communicate with 115a-b, and that environment data may be acquired through sensors 405 capturing information about the environment. For example, cameras in the environment, such as attached to the BS 105, may capture imagery of the cell environment and that imagery accumulated as sensor data 420 that is provided to a beam management (BM) server 422 for managing the association of candidate beams 410a-c and 412a-c with locations of the UEs 115a-b. Other example sensor data may include radar data or lidar data acquired from devices in communication with the BM server 422. Additionally, predetermined data 424, such as three-dimensional (3-D) cell environment profiling data obtained during setup of the BS 105, may provide information regarding static aspects of the cell environment served by the BS 105. The BM server 422 may use the sensor data 420 in determining candidate beams for the UEs 115a-b and selecting particular candidate beams for communicating with the UEs 115a-b. The use of sensor data 420 may provide information regarding dynamic aspects of the cell environment that allow the BM server 422 to better determine candidate beams for the UEs 115a-b.

Further, the BM server 422 may use a beam management reporting history to provide information regarding dynamic aspects of the cell environment that allow the BM server 422 to better determine candidate beams for the UEs 115a-b, in complimentary combination with the UE location and sensor data. For example, the UE 115b may provide a UE1 BM report with information regarding candidate beams 412a-c along with a location of the UE 115b. Likewise, the UE 115a may provide a UE2 BM report with information regarding candidate beams 410a-c along with a location of the UE 115a. The BM server 422 may accumulate BM reports from all the UEs served by the cell including the UEs 115a-b at various locations and times to accumulate the beam management reporting history per location/spot and also to track some long-term changes taking place in the environment that are reflected in BM reports provided for the same location at different times. The beam management reporting history may be analyzed, in view of complimentary sensor data, to determine long-term changes in the cell environment, such as to recognize that some beams relevant for some corresponding UE locations may be blocked by new buildings, structures, or foliage present in the cell environment.

An example of the benefit of the sensor data availability to the BM server 422 is shown in FIG. 5. FIG. 5 is a block diagram illustrating an example model of a cell environment served by a BS with shadowing of some beams according to some aspects. The vehicle 406 may continue to move down a street eventually causing shadowing of candidate beams 412a-b. Camera data acquired from the environment can be used to identify the movement of the vehicle 406 and predict the shadowing effect of the vehicle on candidate beams 412a-b prior to the vehicle 406 severing communications with the UE 115b. When the shadowing of candidate beam 412a-b is predicted from the sensor data 420, the BM server 422 may cause the BS 105 to switch beams to a different candidate beam, such as candidate beam 412c, that provides better link quality. The BS 105 may issue appropriate commands to the UE 115b to carry out the beam switch. Although sensor data 420 is illustrated in the prediction of beam shadowing, the sensor data 420 may be used in the determination of other dynamic aspects of the cell environment that affect link quality.

The UE 115b may change the contents of the BM report based on changing quality of beams received at the UE's location. For example, FIG. 5 illustrates that the UE1 BM report includes information on beam idx3, beam idx4, and beam idx2, associated with the UE1 location. Previously, as shown in FIG. 4, the UE 115b transmitted a UE1 BM report including information on beam idx1, beam idx2, and beam idx3, associated with the UE1 location. Sensor data may be used to interpret the changing BM reports to determine which changes are short-term and which charts are long-term for the purposes of managing associations of beams with UE locations as described in more detail below.

FIG. 6 is a flow diagram illustrating an example process 600 that supports beam selection based on sensor data according to some aspects. Operations of the process 600 may be performed by a BS, such as the BS 105 described above with reference to FIGS. 1-3. For example, example operations (also referred to as "blocks") of the process 600 may enable the BS 105 to better determine beams for communicating between the BS 105 and the UE 115 by using a model of the cell environment based on sensor data.

In block 602, the BS obtains sensor data associated with a cell environment served by the BS.

In block 604, the BS receives a plurality of beam management (BM) reports from one or more UEs.

In block 606, the BS determines a beam management reporting history for a plurality of beams of the BS based on the plurality of BM reports received at block 604.

In block 608, the BS 105 associates a plurality of beams with a plurality of possible UE locations in a cell environment served by the BS. The associations are based on a complimentary combination of sensor data regarding the cell environment served by the BS and beam management reporting history associated with the plurality of beams, or each of the beam management reporting history or sensor data individually. For example, the BS 105 may receive image data from a camera in the environment. The BS 105 may process the raw image data, such as by applying a computer vision algorithm or a machine learning algorithm or both to detect, identify, or track objects in the environment, and determine the effect of the object on beams available at the BS, and appropriately update the candidate beams for possible UE locations. As another example, the BS 105 may process BM reports collected from a plurality of UEs located in a plurality of locations and over time to determine the beam management reporting history. The beams available at the BS 105 may be evaluated for each possible UE location to determine candidate beams using information about the cell environment determined from the sensor data, the beam management reporting history, or a combination thereof. The candidate beams may be maintained in a table stored in the memory of the BS 105. An example table that may be maintained by the BS 105 is shown below:

| Grid of locations under cell range | Candidate beam 1 | Candidate beam 2 | Candidate beam 3 |
|---|---|---|---|
| UE location spot 1 | SSB idx1(1) | SSB idx2(1) | SSB idx3(1) |
| UE location spot 2 | SSB idx1(2) | SSB idx2(2) | SSB idx3(2) |
| ... | ... | ... | ... |
| UE location spot N | SSB idx1(N) | SSB idx2(N) | SSB idx3(N) |

In some embodiments, the candidate beams may be associated with UE locations and different environmental conditions. For example, candidate beams may be identified for a first condition of the cell environment (e.g., a short-term condition) and a second condition of the cell environment (e.g., a long-term condition). An example table that may be maintained by the BS 105 reflecting associations with different environmental conditions 1-M is shown below:

| Grid of locations under cell range | Cell Environment Condition | Candidate beam 1 | Candidate beam 2 | Candidate beam 3 |
|---|---|---|---|---|
| UE location spot 1 | Environment condition 1 | SSB idx1(1) | SSB idx2(1) | SSB idx3(1) |
| UE location spot 1 | ... | | | |
| UE location spot 1 | Environment condition M | SSB idx1(1) | SSB idx2(1) | SSB idx3(1) |
| UE location spot 2 | Environment condition 1 | SSB idx1(2) | SSB idx2(2) | SSB idx3(2) |
| UE location spot 2 | ... | | | |
| UE location spot 2 | Environment condition M | SSB idx1(2) | SSB idx2(2) | SSB idx3(2) |
| ... | | ... | ... | ... |
| UE location spot N | Environment condition M | SSB idx1(N) | SSB idx2(N) | SSB idx3(N) |

The BS may receive multiple BM reports from a UE at the same location at different times. The BS may determine a context of the cell environment at the time of the BM reports, such as by associating the BM report with sensor data that is associated with the time of the BM report and the UE location associated with the report. This complementary information of the sensor data and the BM reports may be used in managing the associations in the table of candidate beams with environmental conditions and UE locations. The BS may thus better determine long-term changes in the cell environment or predict short-term environment conditions including new blockers or reflectors affecting beams transmitted from the BS.

In block 610, the BS 105 determine a first location of a first UE. For example, the BS 105 may receive a location report from the UE identifying a location determined from a global positioning system (GPS). The location report may be received as part of an L1 RSRP report, in which the UE attaches its location information (based on GPS or other positioning method) that has the best alignment with the report content. As another example, the BS 105 may receive a location of the first UE from a subsystem in the BS 105 that is capable of triangulating the first UE's location from antennas of the BS 105. Other example location determination techniques include downlink-time of different arrival (DL-TODA) positioning based on an observed time difference of arrival of a primary reference signal (PRS) pilot received in a DL transmission, uplink-TODA (UL-TODA) positioning based on UL-OTDOA of a sounding reference signal (SRS) pilot in an UL transmission, Multi-cell roundtrip time (RTT) determined from measurements of UL and DL reference signals (RSs) by several BSs, UL-angle of arrival (AoA) determined from measurements of UL AoA by several BSs (or total radiated power (TRP)), DL-angle of departure (AoD) determination based on reference signals received power (RSRP) measurements reported by a UE on different beams for different BSs (such as based on PRS or channel state information-reference signal (CSI-RS) in a DL transmission), locations determined based on sensor data or a combination of any of these techniques.

In block 612, the BS 105 determines a first set of one or more candidate beams of the plurality of beams available at the BS for communicating with the first UE at the first location based on the first location and based on the associating performed at block 602.

In block 614, the BS 105 determines a first beam of the first set of one or more candidate beams of the BS for communicating with the first UE based on the first location and the associations. For example, the BS 105 may access a look-up table identifying a set of candidate beams for the first location indicated at block 604, and select at least one of the candidate beams associated with the first location from the look-up table. The selection may, for example, identify the best candidate beam from the available candidate beams based on criteria such as signal strength for the candidate beam, bandwidth available on the candidate beam, latency achievable with the candidate beam, network resources available for the candidate beam, or a combination thereof. In some implementations, the BS 105 may adjust beam width for each UE depending on the UE's movement speed, movement trajectory, and environment dynamics, which may be determined from the sensor data.

In block 616, the BS 105 transmits a communication to the first UE using the first beam determined at block 608. In some implementations, the transmitted communications to the first UE may include a listing of candidate beams for communicating with the BS 105 at the first location, and may be updated based on changes in the UE location or changes in the cell environment. The listing may include a set of serving beams and an additional non-overlapping set of other candidate beams. The listing may be addressed on a UE side under an additional dedicated TCI states table for candidate beams or using a special table dedicated for candidate beams masking or notation on top of an existing TCI states table listing all the configured TCI states. Activation of a TCI state from the table of configured TCI states makes the corresponding beam of the activated TCI state become a serving beam.

The indication regarding the candidate beams can be transmitted by means of a candidate Transmission Configuration Indicator (TCI) state activation message using a medium access control (MAC) control element (MAC-CE) message. Usage of MAC-CE based activation may allow frequent reactivation of candidate beams to allow continuous-in-time, fast, and synchronous indication delivery to a UE. The listing may be the best candidate beams for the current UE's location and environmental conditions determined from the associating performed at block 602. The other candidate beams indicated in the MAC-CE message that are not current serving beams may be used on the UE side to focus UE beam-tracking efforts on the indicated list of beams rather than continuously determine them based on SSB beams sweeping. The other candidate beams may also or alternatively be the focus of UE beam failure recovery procedures and involved measurements to reduce power consumption. The other candidate beams may also or alternatively be the beams considered by the UE for Maximum Permissible Exposure (MPE) management and related UL beam selection. For example, with candidate beams the UE may track the UE beam with more coarse measurements than the serving beam.

A beam switch indicator, such as the MAC-CE message, may be followed by an AP P3 session scheduling to allow a fast UE beam adjustment to the new serving beam. The AP P3 session may involve UE beam selection, refinement, or tracking performed based on P3 beam management (BM) channel state information reference signal (CSI-RS) resources.

Optionally, the BS can also schedule a P2 BM session for BS beam refinement to identify narrow beams corresponding to a coarse beam indicated as an alternate beam in the list of beams. The P2 BM session is assisted by L1 RSRP reporting by the UE for several selected beams from the list based on BM CSI-RS resources. P2 BM sessions can be scheduled to verify or refine a best beam among the candidate beams prior to beam switching. A P2 BM session may be scheduled based on provisioning for the potential beam switch to maintain link performance. The transmission of lists of candidate beams can allow the UE to focus UE beam tracking efforts on the indicated list of candidate beams, reducing operations to continuously determine the candidate beams based on SSB beam sweeping. This can allow the UE to avoid an exhaustive search of beams on multiple SSBs, thus reducing UE power consumption.

In some implementations, the managing of associations between candidate beams and possible UE locations may involve the generation of a model of the environment of the cell. For example, each object in the environment may be correlated to a corresponding location in a three-dimensional (3-D) map in real time. Ray tracing may be performed using the model to determine how objects in the environment affect propagation and potential shadowing of wireless signals transmitted from the BS 105 on beams available at the BS 105. The model may allow the BS 105 to predict blockage of beams associated with possible UE locations or to determine the appearance of new candidate beams associated with new reflections from objects in the environment. This allows the BS 105 to act proactively in beam management to reduce link disruptions with UEs.

FIG. 7 is a flow diagram illustrating an example process 700 that supports selection of beams based on a model generated from ray tracing around objects defined using sensor data and BM reports according to some aspects. Operations of the process 700 may be performed by a base station, such as the BS 105 described above with reference to FIGS. 1-3 or a base station as described with reference to FIG. 10. For example, example operations of the process 700 may enable the BS 105 to manage associates of a plurality of candidate beams available at the BS with a plurality of possible locations of UEs.

In block 702, the BS 105 receives sensor data associated with the cell environment served by the BS 105 and corresponding BM reports. The sensor data may be used in combination with the BM reports to understand a context of the BM reports when determining a 3-D model of the cell environment.

In block 704, the BS 105 determines a 3-D model of the cell environment served by the BS that defines objects in the environment based on the sensor data. The 3-D model may also incorporate offline 3D environment mapping information. For example, the offline information may provide a 3-D topographic map to locate and track objects on top of it based on sensor data.

In block 706, the BS 105 performs ray tracing based on the objects defined in the environment for a plurality of possible UE locations in the cell environment.

In block 708, the BS 105 determines a respective propagation path and potential shadowing for each UE location and for each of the plurality of beams at the BS based on the ray tracing.

In block 710, the BS 105 associates a plurality of candidate beams with the plurality of possible UE locations based on the respective determined propagation path and potential shadowing for each of the plurality of beams available at the BS. The BS 105 may continue to update the associations, such as by updating the example table described above, as sensor data is received by repeating blocks 702, 704, 706, 708, and 710.

In typical implementations, beam management on the BS 105 may be performed using beam management (BM) reports received from UEs in the cell environment served by the BS. BM reports may provide additional information that may be used in managing the association of a plurality of candidate beams with a plurality of possible UE locations. For example, each UE may provide periodic or aperiodicL1 RSRP reports for up to four best beams. For each L1 RSRP report, the UE may attach location information (such as an indication of GPS coordinates). Multiple UEs moving throughout the cell environment served by the BS may provide ongoing statistical information from which the BS 105 may manage the association of a plurality of candidate beams with a plurality of possible UE locations. The BM reports history and statistics can allow for beam management to follow long-term changes in the cell environment and determine the 3-D model based on those mid or long-term changes. Thus, the BM reports may be used in the determining of associations of candidate beams per UE locations/spots under the cell coverage range and hence can allow enhancements in beam management procedures. The BM reports may allow capturing more precision regarding the impact of foliage and other objects that affect propagation paths and potential shadowing by changing reflection and absorption aspects of the environment.

In some embodiments, the context may be used to determine how a BM report affects the model of the cell environment by determining whether the BM report indicates a short-term or long-term change or event in the cell environment. For example, the first context of the first BM report may be used to determine that the first BM report indicates a short-term condition in the cell environment, and the second context of the second BM report may be used to determine that the second BM report indicates a long-term condition in the cell environment. When associations are not tracked based on conditions in the cell environment, BM reports corresponding to a short-term condition may be selectively ignored during the updating of the model of the cell environment. When associations are tracked based on different conditions in the cell environment, BM reports corresponding to a short-term condition may be used to update associations corresponding only to the appropriate condition in the cell environment.

For example, at the beginning of the year a line-of-sight (LOS) propagation may exist from the BS to a UE at a first possible UE location. Each time any UE at that first possible UE location may provide similar BM reports indicating good signal quality for the location, with the exception of short-term blockages by passing objects. The sensor data may be used as context for interpreting the BM reports to determine that a moving object, such as a bus, temporarily caused reduced signal quality but long-term condition and the corresponding beam statistics and associations of a candidate beams should be interpreted from the BM reports that are not associated with a short-term blockage event. Later, when an additional building is built in the cell environment that blocks the LOS propagation between BS and this possible UE location, UEs at this location now provide different BM reports that include reflected beams only. This is an example of long-term environment changes that can be tracked based on corresponding BM reports changes. The sensor data may provide additional context to interpret the reduced availability of the LOS propagation as a long-term cell environment change that can be tracked based on BM report from all UEs for all cell locations.

Figure 8:
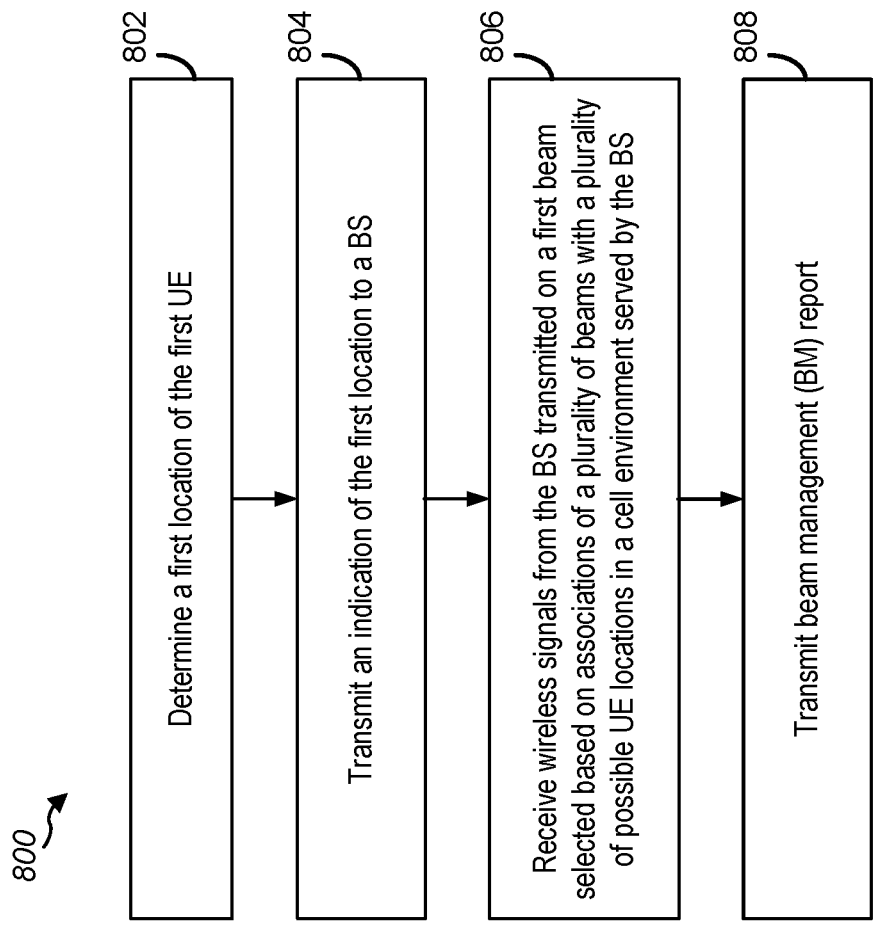
FIG. 8 is a flow diagram illustrating an example process that supports operation of a UE in a network that supports beam selection based on a model of a cell environment served by a BS according to some aspects.

FIG. 8 is a flow diagram illustrating an example process 800 that supports operation of a UE in a network that supports beam selection based on a model of the cell environment served by the BS according to some aspects. Operations of the process 800 may be performed by a UE, such as the UEs 115a-k described above with reference to FIGS. 1-3 or a UE as described with reference to FIG. 9. For example, example operations of the process 800 may enable the UE 115 to more efficiently and reliably operate when communicating with the BS 105 and to provide information through BM reports to allow the BS 105 to more efficiently and reliably select beams for communicating with the UE 115.

In block 802, the UE 115 determines a first location of the first UE. The first location may be determined using a satellite position system (SPS), such as the global positioning system (GPS), GLObal NAvigation Satellite System (GLONASS), or Beidou, or other location determination systems, such as triangulation, network-determined location services, or crowdsourced Wi-Fi locations.

In block 804, the UE 115 transmits an indication of the first location of the UE to the BS. For example, the UE 115 may transmit a location report from the UE identifying a location determined from a global positioning system (GPS). As another example, the UE 115 may transmit a location of the first UE from other example location determination techniques such as downlink-time of different arrival (DL-TODA) positioning based on an observed time difference of arrival of a primary reference signal (PRS) pilot received in a DL transmission, uplink-TODA (UL-TODA) positioning based on UL-OTDOA of a sounding reference signal (SRS) pilot in an UL transmission, Multi-cell roundtrip time (RTT) determined from measurements of UL and DL reference signals (RSs) by several BSs, UL-angle of arrival (AoA) determined from measurements of UL AoA by several BSs (or total radiated power (TRP)), DL-angle of departure (AoD) determination based on reference signals received power (RSRP) measurements reported by a UE on different beams for different BSs (such as based on PRS or channel state information-reference signal (CSI-RS) in a DL transmission), location determined based on sensor data or a combination of any of these techniques.

In block 806, the UE 115 receives wireless signals from the BS transmitted on a first beam selected based on associations of a plurality of candidate beams with a plurality of possible UE locations in a cell environment served by the BS.

In some implementations, the UE 115 may provide an indication regarding the most appropriate beams for its current location through BM reports, and that information may be used by the BS 105 to manage the association of a plurality of candidate beams with a plurality of possible UE locations. For example, in block 808, the UE 115 transmits beam management (BM) reports to the BS, and those beam reports may be associated with the first location by the UE 115 prior to transmission. Alternatively, the BM reports may be transmitted without location information and UE location information may be associated with the UE beam report by the BS 105. In case that BS is equipped with sensor data that can be used to build beams and locations associations based on ray tracing and 3D modeling and continuous tracking of the cell environment, the BS does not have to strongly rely on BM reporting from a UE side as it is typically done in the current millimeter wave (mmw) cell implementations and hence the BS may configure a lower periodicity of beam reporting from the UE, or no reporting to reduce UL resource consumption and reduce UE power consumption.

Figure 9:
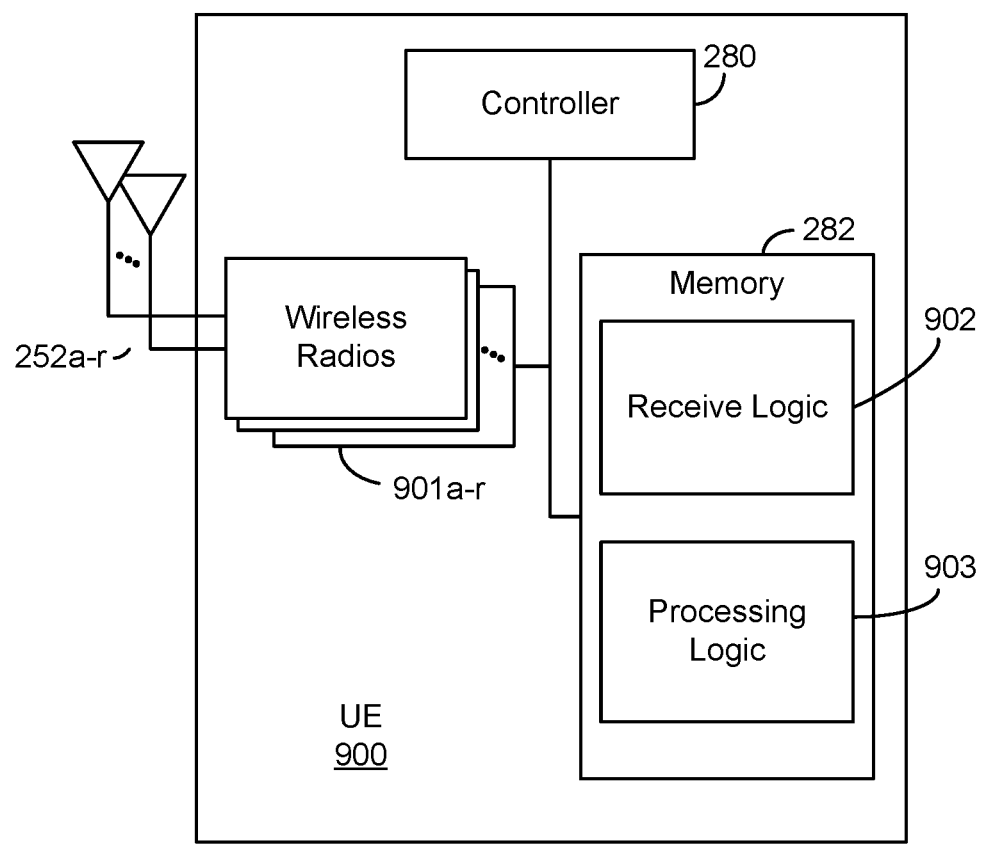
FIG. 9 is a block diagram of an example UE that supports beam switching according to some aspects.

FIG. 9 is a block diagram of an example UE 900 that supports beam selection based on sensor data according to some aspects. The UE 900 may be configured to perform operations, including the blocks of the process 800 described with reference to FIG. 8. In some implementations, the UE 900 includes the structure, hardware, and components shown and described with reference to the UE 115 of FIG. 2 or 3. For example, the UE 900 includes the controller 280, which operates to execute logic or computer instructions stored in the memory 282, as well as controlling the components of the UE 900 that provide the features and functionality of the UE 900. The UE 900, under control of the controller 280, transmits and receives signals via wireless radios 901a-r and the antennas 252a-r. The wireless radios 901a-r include various components and hardware, as illustrated in FIG. 2 for the UE 115, including the modulator and demodulators 254a-r, the MIMO detector 256, the receive processor 258, the transmit processor 264, and the TX MIMO processor 266.

As shown, the memory 282 may include receive logic 902 and processing logic 903. The receive logic 902 may be configured to process beam selection indications or beam switch indications. The UE 900 may receive signals from or transmit signals to one or more network entities, such as the base station 105 of FIGS. 1-3 or a base station as illustrated in FIG. 10.

In some implementations, the UE 900 may be configured to perform the process 700 of FIG. 7. To illustrate, the UE 900 may execute, under control of the controller 280, the receive logic 902 and the processing logic 903, stored in the memory 282. The execution environment of the receive logic 902 provides the functionality to perform at least the operations in block 806. The execution environment of the processing logic 903 provides the functionality to perform at least the operations in block 802, 804, and 808.

Figure 10:
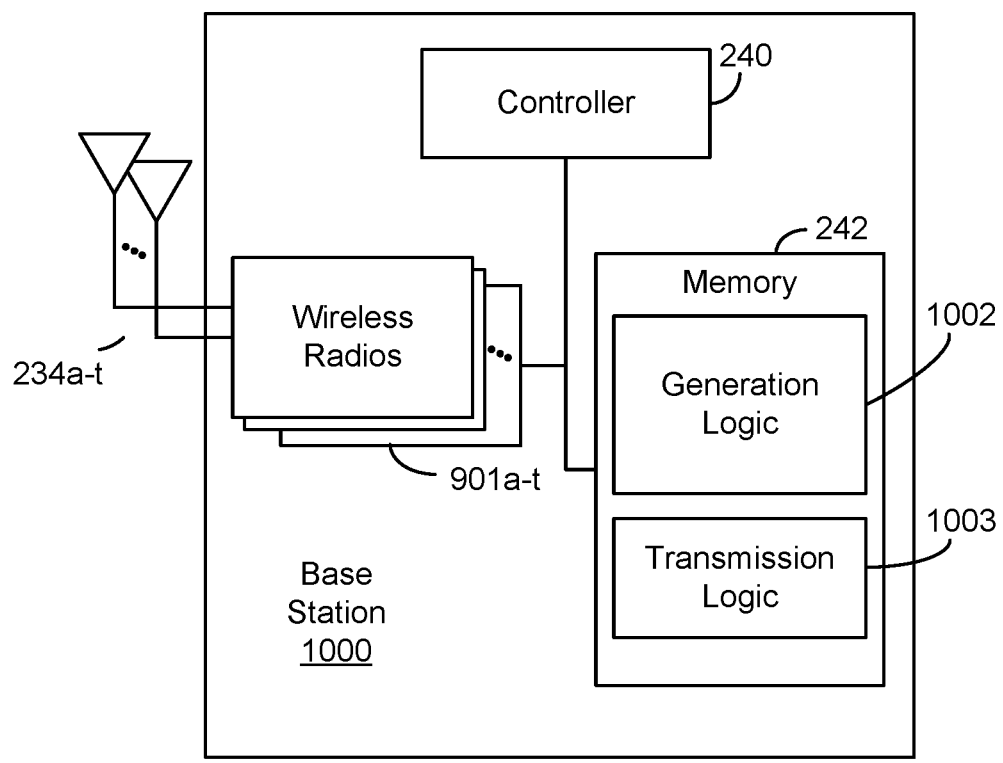
FIG. 10 is a block diagram of an example base station that supports beam selection based on a complementary combination of sensor data and beam management reporting history according to some aspects.

FIG. 10 is a block diagram of an example base station 1000 that supports beam selection based on sensor data according to some aspects. The base station 1000 may be configured to perform operations, including the blocks of the process 600 or 700 described with reference to FIG. 6 or 7, respectively. In some implementations, the base station 1000 includes the structure, hardware, and components shown and described with reference to the base station 105 of FIGS. 1-3. For example, the base station 1000 may include the controller 240, which operates to execute logic or computer instructions stored in the memory 242, as well as controlling the components of the base station 1000 that provide the features and functionality of the base station 1000. The base station 1000, under control of the controller 240, transmits and receives signals via wireless radios 1001*a-t* and the antennas 234*a-t*. The wireless radios 1001*a-t* include various components and hardware, as illustrated in FIG. 2 for the base station 105, including the modulator and demodulators 232*a-t*, the transmit processor 220, the TX MIMO processor 230, the MIMO detector 236, and the receive processor 238.

As shown, the memory 242 may include generation logic 1002 and transmission logic 1003. The generation logic 1002 may be configured to manage the associations of candidate beams with possible UE locations. The base station 1000 may receive signals from or transmit signals to one or more UEs, such as the UE 115 of FIGS. 1-3 or the UE 900 of FIG. 9.

In some implementations, the base station 1000 may be configured to perform the process 600 of FIG. 6 or process 700 of FIG. 7. To illustrate, the base station 1000 may execute, under control of the controller 240, the generation logic 1002 and the transmission logic 1003 stored in the memory 242. The execution environment of the generation logic 1002 provides the functionality to perform at least the operations in block 602, 604, 606, 702, 704, 706, 708, and 710. The execution environment of the transmission logic 1003 provides the functionality to perform at least the operations in block 608.

It is noted that one or more blocks (or operations) described with reference to FIGS. 6 may be combined with one or more blocks (or operations) described with reference to another of the figures. For example, one or more blocks (or operations) of FIG. 6 may be combined with one or more blocks (or operations) of FIG. 7. As another example, one or more blocks associated with FIG. 6 or 7 may be combined with one or more blocks (or operations) associated with FIG. 2 or 3.

In some aspects, techniques for enabling beam selection using sensor data may include additional aspects, such as any single aspect or any combination of aspects described below or in connection with one or more other processes or devices described elsewhere herein. In some aspects, enabling beam selection using sensor data may include an of a wireless device, such as a UE or a BS. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a first aspect, the processor is configured to perform a method that includes obtaining sensor data associated with a cell environment served by the BS; receiving a plurality of beam management (BM) reports, associated with a plurality of beams transmitted by the BS, from a plurality of user equipments (UEs) at a plurality of possible UE locations in the cell environment; determining a beam management reporting history based on the plurality of BM reports; associating the plurality of beams with the plurality of possible UE locations based on the sensor data and the beam management reporting history; determining a first location of a first UE in the cell environment; determining a first set of one or more candidate beams of the plurality of beams based on the first location and based on the associating; determining a first beam of the first set of one or more candidate beams for communicating with the first UE; and transmitting a communication to the first UE using the first beam. The method may be implemented in a base station (BS). The BS includes at least one processor and a memory coupled with the at least one processor and storing processor-readable instructions that, when executed by the at least one processor, is configured to perform aspects of embodiments of the disclosed methods.

In a second aspect, alone or in combination with the first aspect, determining the first location comprises at least one of: performing downlink-time of different arrival (DL-TODA) positioning, wherein the first location is determined based on the DL-TODA positioning; performing uplink-TODA (UL-TODA) positioning, wherein the first location is determined based on the UL-TODA positioning; performing multi-cell roundtrip time (RTT) positioning, wherein the first location is determined based on the RTT positioning; performing UL-angle of arrival (AoA) positioning, wherein the first location is determined based on the AoA positioning; performing DL-angle of departure (AoD) positioning, wherein the first location is determined based on the AoD positioning; determining the first location based on the sensor data; or receiving a UE location report from the first UE, wherein the first location is determined based on the UE location report.

In a third aspect, alone or in combination with one or more of the first through second aspects, the associating comprises: determining a three-dimensional (3-D) model of the cell environment that defines objects in the cell environment based on the sensor data; performing ray tracing, based on the 3-D model, for the plurality of beams and the plurality of possible UE locations; determining propagation paths and potential shadowing associated with the plurality of beams for the plurality of possible UE locations based on the ray tracing; and determining sets of one or more candidate beams of the plurality of beams for respective locations of the plurality of possible UE locations based on the respective propagation paths and the respective potential shadowing, the sets of one or more candidate beams for the plurality of possible UE locations including the first set of one or more candidate beams for the first location.

In a fourth aspect, alone or in combination with one or more of the first through third aspects, the processor is also configured to receive predetermined 3-D cell profile data characterizing the cell environment, wherein determining the 3-D model of the cell environment is further based on the predetermined 3-D cell profile data.

In a fifth aspect, alone or in combination with one or more of the first through fourth aspects, each of the plurality of BM reports includes a measurement, by a respective UE of the plurality of UEs, of at least one of the plurality of beams and an indication of a location of the respective UE, the method further comprising determining long-term changes in the cell environment based on the beam management reporting history, wherein determining the 3-D model of the cell environment is further based on the long-term changes.

In a sixth aspect, alone or in combination with one or more of the first through fifth aspects, the sensor data includes at least one of camera data, radar data, or lidar data, the method further comprising analyzing the sensor data using a machine learning algorithm, wherein the determining of the 3-D model is based on the analysis.

In a seventh aspect, alone or in combination with one or more of the first through sixth aspects, receiving the plurality of BM reports comprises receiving a first BM report from a UE associated with a first time and a second BM report from the UE associated with a second time, and wherein the associating comprises: associating a set of beams of the plurality of beams with a possible UE location for a first condition of the cell environment, wherein the first condition is a short-term condition; associating another set of beams of the plurality of beams with the possible UE location for a second condition of the cell environment, wherein the second condition is a long-term condition; determining a first context in the cell environment for the first BM report based on the sensor data associated with the first time, wherein the first context corresponds to the first condition; determining a second context in the cell environment for the second BM report based on the sensor data associated with the second time, wherein the second context corresponds to the second condition; associating the set of beams with the possible UE location for the first condition based on the first BM report and the first context; and associating the another set of beams with the possible UE location for the second condition based on the second BM report and the second context.

In an eighth aspect, alone or in combination with one or more of the first through seventh aspects, determining the first beam of the first set of candidate beams comprises determining at least one serving beam of the first set of candidate beams, the at least one serving beam comprising the first beam, and wherein the method further comprises transmitting, to the first UE, a first medium access control element (MAC-CE) message including an indication of an active transmission configuration indicator (TCI) state table corresponding to the at least one serving beam and an indication of a candidate TCI state table corresponding to at least one other beam of the first set of one or more candidate beams.

In a ninth aspect, alone or in combination with one or more of the first through eighth aspects, the processor is also configured to predict shadowing associated with the first beam based on the sensor data; determining a second beam from the first set of one or more candidate beams based on the associating and based on the first location of the first UE; transmitting, to the first UE, a beam switch indication for switching to the second beam in response to predicting the shadowing; and transmitting a communication to the first UE using the second beam.

In a tenth aspect, alone or in combination with one or more of the first through ninth aspects, the processor may be configured to perform a method including receiving wireless signals from a base station (BS) transmitted using a first beam of a first set of one or more candidate beams determined based on associations of a plurality of beams with a plurality of possible UE locations in a cell environment served by the BS and based on a first location of the UE, the associations being based on sensor data associated with the cell environment and a beam management reporting history associated with the plurality of beams and the plurality of possible UE locations.

In an eleventh aspect, alone or in combination with one or more of the first through tenth aspects, the first location of the first UE is determined based on at least one of: performing downlink-time of different arrival (DL-TODA) positioning, wherein the first location is determined based on the DL-TODA positioning; performing uplink-TODA (UL-TODA) positioning, wherein the first location is determined based on the UL-TODA positioning; performing multi-cell roundtrip time (RTT) positioning, wherein the first location is determined based on the RTT positioning; performing UL-angle of arrival (AoA) positioning, wherein the first location is determined based on the AoA positioning; performing DL-angle of departure (AoD) positioning, wherein the first location is determined based on the AoD positioning; determining the first location based on the sensor data; or receiving a UE location report from the first UE, wherein the first location is determined based on the UE location report.

In a twelfth aspect, alone or in combination with one or more of the first through eleventh aspects, the associations are determined by: determining a three-dimensional (3-D) model of the cell environment that defines objects in the environment based on the sensor data; performing ray tracing, based on the 3-D model, for the plurality of beams and the plurality of possible UE locations; determining propagation paths and potential shadowing associated with each of the plurality of beams for the plurality of possible UE locations based on the ray tracing; and determining sets of one or more candidate beams of the plurality of beams for respective locations of the plurality of possible UE locations based on the respective propagation paths and the respective potential shadowing, the sets of one or more candidate beams for the plurality of possible UE locations including the first set of one or more candidate beams for the first location.

In a thirteenth aspect, alone or in combination with one or more of the first through twelfth aspects, the 3-D model is determined based also on predetermined 3-D cell profile data characterizing the cell environment.

In a fourteenth aspect, alone or in combination with one or more of the first through thirteenth aspects, the processor is also configured to transmit, to the BS, a first beam management (BM) report associated with the first location and associated with a first time, wherein the associations are based on long-term changes in the cell environment based on the beam management reporting history including the first BM report, wherein the 3-D model of the cell environment is further based on the long-term changes.

In a fifteenth aspect, alone or in combination with one or more of the first through fourteenth aspects, the sensor data includes at least one of camera data, radar data, or lidar data, wherein the first beam is determined based on analysis of the sensor data using a machine learning algorithm, and wherein the determining of the 3-D model is based on the analysis.

In a sixteenth aspect, alone or in combination with one or more of the first through fifteenth aspects, the processor is also configured to transmit, to the BS, a first BM report associated with a first time; and transmitting, to the BS, a second BM report associated with a second time, wherein the associations associate a set of beams of the plurality of beams with a possible UE location for a first condition of the cell environment and associate another set of beams of the plurality of beams with the possible UE location for a second condition of the cell environment, wherein the first condition is a short-term condition and the second condition is a long-term condition, and wherein the associations are based on: determining a first context in the cell environment for the first BM report based on the sensor data associated with the first time, wherein the first context corresponds to the short-term condition; determining a second context in the cell environment for the second BM report based on the sensor data associated with the second time, wherein the second context corresponds to the long-term condition; associating the set of beams with the possible UE location for the first condition based on the first BM report and the first context; and associating the another set of beams with the possible UE location for the second condition based on the second BM report and the second context.

In a eighteenth aspect, alone or in combination with one or more of the first through seventeenth aspects, the processor is also configured to receive a first medium access control (MAC) control element (MAC-CE) message including an indication of an active transmission configuration indicator (TCI) state table corresponding to the at least one serving beam, the at least one serving beam including the first beam, and an indication of a candidate TCI states table corresponding to at least one other beam of the first set of one or more candidate beams.

In a nineteenth aspect, alone or in combination with one or more of the first through eighteenth aspects, the processor is also configured to receive a beam switch indication for switching to a second beam selected from a first set of one or more candidate beams based on the associations, the first set of one or more candidate beams including the first beam, and the beam switch indication based on predicting shadowing associated with the first beam based on the sensor data; and receiving wireless signals from the BS transmitted on the second beam Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-10 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication performed by a base station (BS), the method comprising:
    obtaining sensor data associated with a cell environment served by the BS;
    receiving a plurality of beam management (BM) reports, associated with a plurality of beams transmitted by the BS, from a plurality of user equipments (UEs) at a plurality of possible UE locations in the cell environment;
    determining a beam management reporting history based on the plurality of BM reports;
    associating the plurality of beams with the plurality of possible UE locations based on the sensor data and the beam management reporting history;
    determining a first location of a first UE in the cell environment;
    determining a first set of one or more candidate beams of the plurality of beams based on the first location and based on the associating;
    determining a first beam of the first set of one or more candidate beams for communicating with the first UE; and
    transmitting a communication to the first UE using the first beam.

2. The method of claim 1, wherein determining the first location comprises at least one of:
    performing downlink-time of different arrival (DL-TODA) positioning, wherein the first location is determined based on the DL-TODA positioning;
    performing uplink-TODA (UL-TODA) positioning, wherein the first location is determined based on the UL-TODA positioning;
    performing multi-cell roundtrip time (RTT) positioning, wherein the first location is determined based on the RTT positioning;
    performing UL-angle of arrival (AoA) positioning, wherein the first location is determined based on the AoA positioning;
    performing DL-angle of departure (AoD) positioning, wherein the first location is determined based on the AoD positioning;
    determining the first location based on the sensor data; or
    receiving a UE location report from the first UE, wherein the first location is determined based on the UE location report.

3. The method of claim 1, wherein the associating comprises:
    determining a three-dimensional (3-D) model of the cell environment that defines objects in the cell environment based on the sensor data;

performing ray tracing, based on the 3-D model, for the plurality of beams and the plurality of possible UE locations;

determining propagation paths and potential shadowing associated with the plurality of beams for the plurality of possible UE locations based on the ray tracing; and determining sets of one or more candidate beams of the plurality of beams for respective locations of the plurality of possible UE locations based on the respective propagation paths and the respective potential shadowing, the sets of one or more candidate beams for the plurality of possible UE locations including the first set of one or more candidate beams for the first location.

4. The method of claim 3, further comprising receiving predetermined 3-D cell profile data characterizing the cell environment, wherein determining the 3-D model of the cell environment is further based on the predetermined 3-D cell profile data.

5. The method of claim 3, wherein each of the plurality of BM reports includes a measurement, by a respective UE of the plurality of UEs, of at least one of the plurality of beams and an indication of a location of the respective UE, the method further comprising determining long-term changes in the cell environment based on the beam management reporting history, wherein determining the 3-D model of the cell environment is further based on the long-term changes.

6. The method of claim 3, wherein the sensor data includes at least one of camera data, radar data, or lidar data, the method further comprising analyzing the sensor data using a machine learning algorithm, wherein the determining of the 3-D model is based on the analysis.

7. The method of claim 1, wherein receiving the plurality of BM reports comprises receiving a first BM report from a UE associated with a first time and a second BM report from the UE associated with a second time, and wherein the associating comprises:

associating a set of beams of the plurality of beams with a possible UE location for a first condition of the cell environment, wherein the first condition is a short-term condition;

associating another set of beams of the plurality of beams with the possible UE location for a second condition of the cell environment, wherein the second condition is a long-term condition;

determining a first context in the cell environment for the first BM report based on the sensor data associated with the first time, wherein the first context corresponds to the first condition;

determining a second context in the cell environment for the second BM report based on the sensor data associated with the second time, wherein the second context corresponds to the second condition;

associating the set of beams with the possible UE location for the first condition based on the first BM report and the first context; and associating the another set of beams with the possible UE location for the second condition based on the second BM report and the second context.

8. The method of claim 1, wherein determining the first beam of the first set of candidate beams comprises determining at least one serving beam of the first set of candidate beams, the at least one serving beam comprising the first beam, and wherein the method further comprises transmitting, to the first UE, a first medium access control element (MAC-CE) message including an indication of an active transmission configuration indicator (TCI) state table corresponding to the at least one serving beam and an indication of a candidate TCI state table corresponding to at least one other beam of the first set of one or more candidate beams.

9. The method of claim 1, further comprising:

predicting shadowing associated with the first beam based on the sensor data;

determining a second beam from the first set of one or more candidate beams based on the associating and based on the first location of the first UE;

transmitting, to the first UE, a beam switch indication for switching to the second beam in response to predicting the shadowing; and transmitting a communication to the first UE using the second beam.

10. A method for wireless communication performed by a user equipment (UE), the method comprising:

receiving wireless signals from a base station (BS) transmitted using a first beam of a first set of one or more candidate beams determined based on associations of a plurality of beams with a plurality of possible UE locations in a cell environment served by the BS and based on a first location of the UE, the associations being based on sensor data associated with the cell environment and a beam management reporting history associated with the plurality of beams and the plurality of possible UE locations.

11. The method of claim 10, wherein the first location of the first UE is determined based on at least one of:

performing downlink-time of different arrival (DL-TODA) positioning, wherein the first location is determined based on the DL-TODA positioning;

performing uplink-TODA (UL-TODA) positioning, wherein the first location is determined based on the UL-TODA positioning;

performing multi-cell roundtrip time (RTT) positioning, wherein the first location is determined based on the RTT positioning;

performing UL-angle of arrival (AoA) positioning, wherein the first location is determined based on the AoA positioning;

performing DL-angle of departure (AoD) positioning, wherein the first location is determined based on the AoD positioning;

determining the first location based on the sensor data; or receiving a UE location report from the first UE, wherein the first location is determined based on the UE location report.

12. The method of claim 10, wherein the associations are determined by:

determining a three-dimensional (3-D) model of the cell environment that defines objects in the environment based on the sensor data;

performing ray tracing, based on the 3-D model, for the plurality of beams and the plurality of possible UE locations;

determining propagation paths and potential shadowing associated with each of the plurality of beams for the plurality of possible UE locations based on the ray tracing; and determining sets of one or more candidate beams of the plurality of beams for respective locations of the plurality of possible UE locations based on the respective propagation paths and the respective potential shadowing, the sets of one or more candidate beams for the plurality of possible UE locations including the first set of one or more candidate beams for the first location.

13. The method of claim 12, wherein the 3-D model is determined based also on predetermined 3-D cell profile data characterizing the cell environment.

14. The method of claim 12, further comprising:
transmitting, to the BS, a first beam management (BM) report associated with the first location and associated with a first time,
wherein the associations are based on long-term changes in the cell environment based on the beam management reporting history including the first BM report, wherein the 3-D model of the cell environment is further based on the long-term changes.

15. The method of claim 12, wherein the sensor data includes at least one of camera data, radar data, or lidar data, wherein the first beam is determined based on analysis of the sensor data using a machine learning algorithm, and wherein the determining of the 3-D model is based on the analysis.

16. The method of claim 10, further comprising:
transmitting, to the BS, a first BM report associated with a first time; and
transmitting, to the BS, a second BM report associated with a second time,
wherein the associations associate a set of beams of the plurality of beams with a possible UE location for a first condition of the cell environment and associate another set of beams of the plurality of beams with the possible UE location for a second condition of the cell environment, wherein the first condition is a short-term condition and the second condition is a long-term condition, and
wherein the associations are based on:
determining a first context in the cell environment for the first BM report based on the sensor data associated with the first time, wherein the first context corresponds to the short-term condition;
determining a second context in the cell environment for the second BM report based on the sensor data associated with the second time, wherein the second context corresponds to the long-term condition;
associating the set of beams with the possible UE location for the first condition based on the first BM report and the first context; and
associating the another set of beams with the possible UE location for the second condition based on the second BM report and the second context.

17. The method of claim 10, further comprising:
receiving a first medium access control (MAC) control element (MAC-CE) message including an indication of an active transmission configuration indicator (TCI) state table corresponding to the at least one serving beam, the at least one serving beam including the first beam, and an indication of a candidate TCI states table corresponding to at least one other beam of the first set of one or more candidate beams.

18. The method of claim 10, further comprising:
receiving a beam switch indication for switching to a second beam selected from a first set of one or more candidate beams based on the associations, the first set of one or more candidate beams including the first beam, and the beam switch indication based on predicting shadowing associated with the first beam based on the sensor data; and
receiving wireless signals from the BS transmitted on the second beam.

19. A base station comprising:
at least one processor; and
a memory coupled with the at least one processor and storing processor-readable code that, when executed by the at least one processor, is configured to:
obtain sensor data associated with a cell environment served by the BS;
receive a plurality of beam management (BM) reports, associated with a plurality of beams transmitted by the BS, from a plurality of user equipments (UEs) at a plurality of possible UE locations in the cell environment;
determine a beam management reporting history based on the plurality of BM reports;
associate the plurality of beams with the plurality of possible UE locations based on the sensor data and the beam management reporting history;
determine a first location of a first UE in the cell environment;
determine a first set of one or more candidate beams of the plurality of beams based on the first location and based on the associating;
determine a first beam of the first set of one or more candidate beams for communicating with the first UE; and
transmit a communication to the first UE using the first beam.

20. The base station of claim 19, wherein the first location is determined by at least one at least one of:
performing downlink-time of different arrival (DL-TODA) positioning, wherein the first location is determined based on the DL-TODA positioning;
performing uplink-TODA (UL-TODA) positioning, wherein the first location is determined based on the UL-TODA positioning;
performing multi-cell roundtrip time (RTT) positioning, wherein the first location is determined based on the RTT positioning;
performing UL-angle of arrival (AoA) positioning, wherein the first location is determined based on the AoA positioning;
performing DL-angle of departure (AoD) positioning, wherein the first location is determined based on the AoD positioning;
determining the first location based on the sensor data; or
receiving a UE location report from the first UE, wherein the first location is determined based on the UE location report.

21. The base station of claim 19, wherein the processor is configured to associate by:
determining a three-dimensional (3-D) model of the cell environment that defines objects in the cell environment based on the sensor data;
performing ray tracing, based on the 3-D model, for the plurality of beams and the plurality of possible UE locations;
determining propagation paths and potential shadowing associated with the plurality of beams for the plurality of possible UE locations based on the ray tracing; and
determining sets of one or more candidate beams of the plurality of beams for respective locations of the plurality of possible UE locations based on the respective propagation paths and the respective potential shadowing, the sets of one or more candidate beams for the plurality of possible UE locations including the first set of one or more candidate beams for the first location.

22. The base station of claim 21, wherein the processor is further configured to receive predetermined 3-D cell profile data characterizing the cell environment, wherein determining the 3-D model of the cell environment is further based on the predetermined 3-D cell profile data.

23. The base station of claim 21, wherein each of the plurality of BM reports includes a measurement, by a respective UE of the plurality of UEs, of at least one of the plurality of beams and an indication of a location of the respective UE, the method further comprising determining long-term changes in the cell environment based on the beam management reporting history, wherein determining the 3-D model of the cell environment is further based on the long-term changes.

24. The base station of claim 21, wherein the sensor data includes at least one of camera data, radar data, or lidar data, the method further comprising analyzing the sensor data using a machine learning algorithm, wherein the determining of the 3-D model is based on the analysis.

25. The base station of claim 19, wherein the processor is configured to receive a first BM report from a UE associated with a first time and a second BM report from the UE associated with a second time, and wherein the processor is configured to associated by:
    associating a set of beams of the plurality of beams with a possible UE location for a first condition of the cell environment, wherein the first condition is a short-term condition;
    associating another set of beams of the plurality of beams with the possible UE location for a second condition of the cell environment, wherein the second condition is a long-term condition;
    determining a first context in the cell environment for the first BM report based on the sensor data associated with the first time, wherein the first context corresponds to the first condition;
    determining a second context in the cell environment for the second BM report based on the sensor data associated with the second time, wherein the second context corresponds to the second condition;
    associating the set of beams with the possible UE location for the first condition based on the first BM report and the first context; and
    associating the another set of beams with the possible UE location for the second condition based on the second BM report and the second context.

26. The base station of claim 19, wherein the processor is configured to determine the first beam of the first set of candidate beams by determining at least one serving beam of the first set of candidate beams, the at least one serving beam comprising the first beam, and wherein the method further comprises transmitting, to the first UE, a first medium access control element (MAC-CE) message including an indication of an active transmission configuration indicator (TCI) state table corresponding to the at least one serving beam and an indication of a candidate TCI state table corresponding to at least one other beam of the first set of one or more candidate beams.

27. The base station of claim 19, wherein the processor is further configured to:
    predict shadowing associated with the first beam based on the sensor data;
    determine a second beam from the first set of one or more candidate beams based on the associating and based on the first location of the first UE;
    transmit, to the first UE, a beam switch indication for switching to the second beam in response to predicting the shadowing; and
    transmit a communication to the first UE using the second beam.

28. A user equipment (UE) comprising:
    at least one processor; and
    a memory coupled with the at least one processor and storing processor-readable code that, when executed by the at least one processor, is configured to:
        receive wireless signals from a base station (BS) transmitted using a first beam of a first set of one or more candidate beams determined based on associations of a plurality of beams with a plurality of possible UE locations in a cell environment served by the BS and based on a first location of the UE, the associations being based on sensor data associated with the cell environment and a beam management reporting history associated with the plurality of beams and the plurality of possible UE locations.

29. The user equipment of claim 28, wherein the first location of the first UE is determined by at least one of:
    performing downlink-time of different arrival (DL-TODA) positioning, wherein the first location is determined based on the DL-TODA positioning;
    performing uplink-TODA (UL-TODA) positioning, wherein the first location is determined based on the UL-TODA positioning;
    performing multi-cell roundtrip time (RTT) positioning, wherein the first location is determined based on the RTT positioning;
    performing UL-angle of arrival (AoA) positioning, wherein the first location is determined based on the AoA positioning;
    performing DL-angle of departure (AoD) positioning, wherein the first location is determined based on the AoD positioning;
    determining the first location based on the sensor data; or
    receiving a UE location report from the first UE, wherein the first location is determined based on the UE location report.

30. The user equipment of claim 28, wherein the associations are determined by:
    determining a three-dimensional (3-D) model of the cell environment that defines objects in the environment based on the sensor data;
    performing ray tracing, based on the 3-D model, for the plurality of beams and the plurality of possible UE locations;
    determining propagation paths and potential shadowing associated with each of the plurality of beams for the plurality of possible UE locations based on the ray tracing; and
    determining sets of one or more candidate beams of the plurality of beams for respective locations of the plurality of possible UE locations based on the respective propagation paths and the respective potential shadowing,
    the sets of one or more candidate beams for the plurality of possible UE locations including the first set of one or more candidate beams for the first location.

31. The user equipment of claim 30, wherein the 3-D model is determined based also on predetermined 3-D cell profile data characterizing the cell environment.

32. The user equipment of claim 30, wherein the processor is further configured to:
    transmit, to the BS, a first beam management (BM) report associated with the first location and associated with a first time,
    wherein the associations are based on long-term changes in the cell environment based on the beam management reporting history including the first BM report, wherein the 3-D model of the cell environment is further based on the long-term changes.

33. The user equipment of claim 30, wherein the sensor data includes at least one of camera data, radar data, or lidar data, wherein the first beam is determined based on analysis of the sensor data using a machine learning algorithm, and wherein the determining of the 3-D model is based on the analysis.

34. The user equipment of claim 28, wherein the processor is further configured to:
- transmit, to the BS, a first BM report associated with a first time; and
- transmit, to the BS, a second BM report associated with a second time, wherein the associations associate a set of beams of the plurality of beams with a possible UE location for a first condition of the cell environment and associate another set of beams of the plurality of beams with the possible UE location for a second condition of the cell environment, wherein the first condition is a short-term condition and the second condition is a long-term condition, and wherein the associations are based on:
- determining a first context in the cell environment for the first BM report based on the sensor data associated with the first time, wherein the first context corresponds to the short-term condition;
- determining a second context in the cell environment for the second BM report based on the sensor data associated with the second time, wherein the second context corresponds to the long-term condition;
- associating the set of beams with the possible UE location for the first condition based on the first BM report and the first context; and
- associating the another set of beams with the possible UE location for the second condition based on the second BM report and the second context.

35. The user equipment of claim 28, wherein the processor is further configured to:
- receive a first medium access control (MAC) control element (MAC-CE) message including an indication of an active transmission configuration indicator (TCI) state table corresponding to the at least one serving beam, the at least one serving beam including the first beam, and an indication of a candidate TCI states table corresponding to at least one other beam of the first set of one or more candidate beams.

36. The user equipment of claim 28, wherein the processor is further configured to:
- receive a beam switch indication for switching to a second beam selected from a first set of one or more candidate beams based on the associations, the first set of one or more candidate beams including the first beam, and the beam switch indication based on predicting shadowing associated with the first beam based on the sensor data; and
- receive wireless signals from the BS transmitted on the second beam.

* * * * *